United States Patent [19]

Grossman et al.

[11] 3,755,188

[45] Aug. 28, 1973

[54] DEHALOGENATION PROCESS

[75] Inventors: Leonard N. Grossman; Donald A. Brigham, both of Livermore, Calif.

[73] Assignee: General Electric Company, San Jose, Calif.

[22] Filed: July 17, 1970

[21] Appl. No.: 55,744

[52] U.S. Cl.............. 252/301.1 R, 423/19, 423/59, 423/75, 423/261, 423/325
[51] Int. Cl.............................................. G21c 19/42
[58] Field of Search................ 252/301.1 R; 23/326, 23/352, 354, 355, 139, 140; 117/106 R

[56] References Cited
UNITED STATES PATENTS

| | | | |
|---|---|---|---|
| 3,235,327 | 2/1966 | Blundell et al....................... | 23/355 |
| 3,000,703 | 9/1961 | Brugger ............................... | 23/140 |
| 3,547,598 | 12/1970 | Knudsen .............................. | 23/354 |
| 3,420,619 | 1/1969 | Booker et al. ...................... | 23/140 X |
| 3,481,693 | 12/1969 | Skrivan............................... | 23/139 X |
| 3,333,930 | 8/1967 | Grant et al........................... | 23/346 |

*Primary Examiner*—Carl D. Quarforth
*Assistant Examiner*—R. L. Tate
*Attorney*—Ivor J. James, Jr., Samuel E. Turner, Sam E. Laub, Frank L. Neuhauser, Oscar B. Waddell and Joseph B. Forman

[57] ABSTRACT

Process for dehalogenation of particulate compositions containing metallic oxyhalides to produce metallic oxides by contacting the compositions in a heated atmosphere containing vaporized alcohol. A second gas including inert gases and active dehalogenating gases can be mixed with the vaporized alcohol. A preferred practice has agitation of the particulate compositions containing metallic oxyhalides during the dehalogenation process. The metallic oxide produced by dehalogenation can be freed from any hydrocarbon residues where desired by a subsequent heating step in a reducing atmosphere. The halide ions from the dehalogenation can be recovered as an acid by passing the dehalogenation atmosphere through water.

12 Claims, 1 Drawing Figure

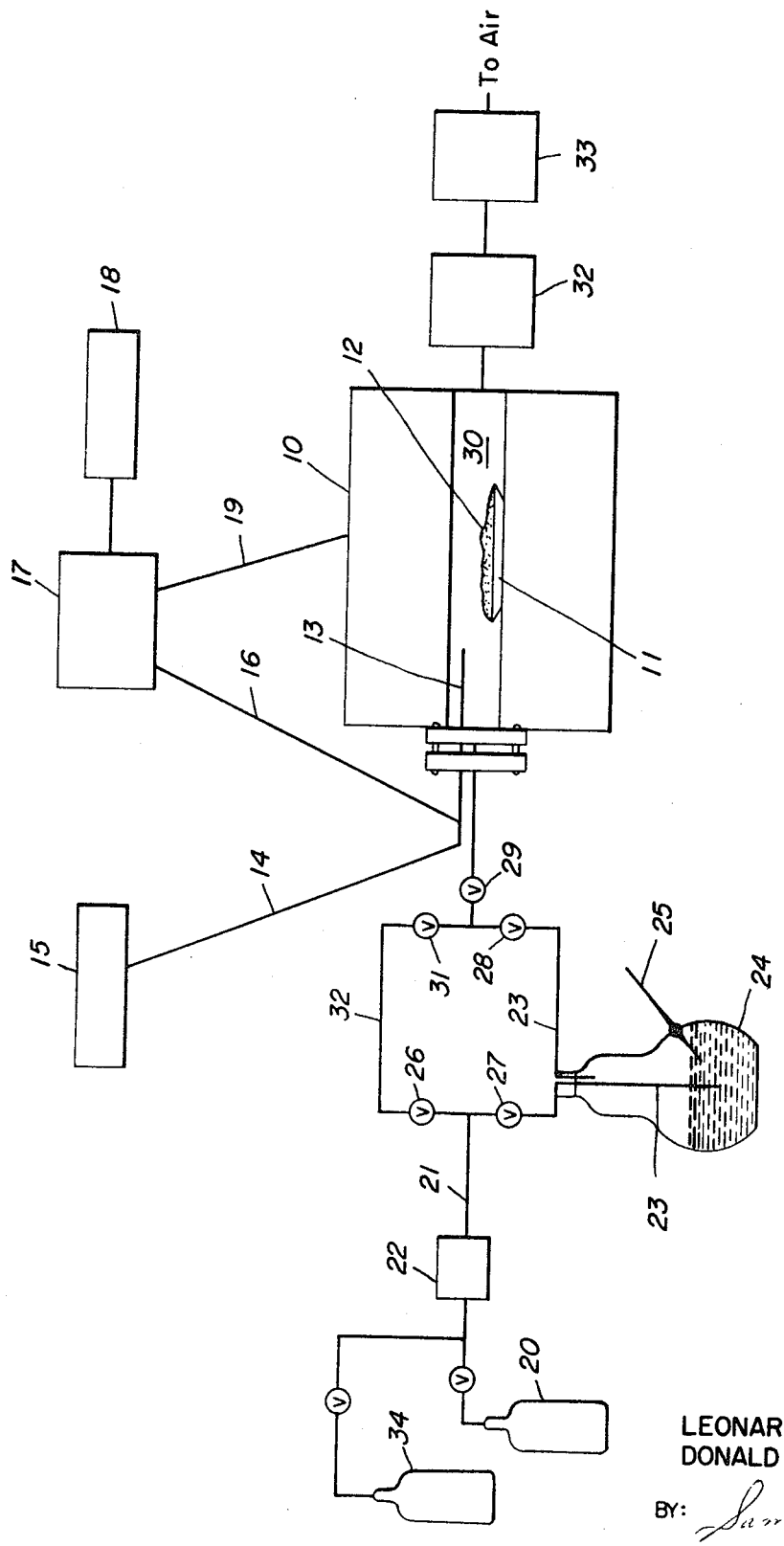

DEHALOGENATION PROCESS

BACKGROUND OF THE INVENTION

Metallic oxides (ceramics) have been prepared in the past from metallic halides by reacting the metallic halides with water to hydrolize the metallic halide and form a water solution of the metallic halide and an acid. One prior art practice has been to convert the resulting metallic oxyhalide to the desired metallic oxide by heating in a reducing atmosphere for dehalogenation.

One specific dehalogenation process is particularly important in the production of enriched uranium oxides, especially uranium dioxide. The production of enriched uranium dioxide is conventionally carried out by gas phase diffusion of halides of uranium so that it is necessary to convert the uranium halide to oxide. Current practice for converting uranium hexafluoride to uranium dioxide, for example, employs hydrolysis of uranium hexafluoride to give a solution of uranyl fluoride and hydrogen fluoride from which ammonium diuranate is precipitated by addition of ammonia. After filtration, the ammonium diuranate of high fluoride ion content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide with a residual fluoride ion concentration, the fluoride ions often being combined with the $UO_2$ to give uranyl fluoride ($UO_2F_2$).

Another process of dehalogenation of metallic oxyhalides utilizes heated atmospheres of hydrogen passed over a bed of the metallic oxyhalide. To dehalogenate a metallic oxyhalide such as uranium oxyfluoride one needs, when using hydrogen, a temperature in excess of about 2000°F to have a practical rate of dehalogenation. Such a temperature produces undesirable properties in the resulting ceramic including the loss of the ability to make dense compacted ceramic bodies from the resulting powder due to a deadening of the powder (loss of surface area of the powder) at the temperature required for the dehalogenation process. In order to lower the temperature for conducting successful dehalogenation of metallic oxyhalides a wet hydrogen atmosphere has been used which has the effect of increasing the rate of dehalogenation at any given temperature when compared to the use of dry hydrogen. This also has a practical effect of lowering the temperature needed to achieve a practical rate of dehalogenation of a metallic oxyhalide. The dehalogenation process using wet hydrogen gives economies of operation and an increased powder activity in that there is greater ability of the powder to be compacted and sintered to dense structures.

In spite of the foregoing, it has still remained desirable to lower the temperature for achieving a practical, rapid rate of dehalogenation of metallic oxyhalide containing compositions. The lower temperature of dehalogenation of metallic oxyhalides enables even greater powder activity, enables greater economies of operation and gives more dense structures after the powders are compacted and sintered.

SUMMARY OF THE INVENTION

Enhanced dehalogenation rates of compositions containing metallic oxyhalides have been achieved using an atmosphere containing vaporized alcohol at a lower temperature range for successful dehalogenation of these compositions than practiced in the prior art.

It is an object of this invention to obtain a rapid dehalogenation of the metallic oxyhalides at lower temperatures than practiced in the prior art to produce a ceramic powder having a high surface area.

It is a further object of the present invention to utilize vaporized alcohol atmospheres with or without a second gas in dehalogenation of metallic oxyhalides.

A particularly preferred object of the present invention is defluorination of metallic oxyfluorides, especially uranium oxyfluoride, by vaporized alcohol atmospheres with or without a second gas in a heated reaction zone.

Other objects and advantages of this invention will become apparent to a person skilled in the art from a reading of the following specification with reference to the attached FIGURE and from the appended claims.

BRIEF DESCRIPTION OF THE DRAWING

The attached FIGURE presents in schematic form a process utilizing vaporized alcohol containing atmospheres, with or without a carrier gas, in a heated furnace to dehalogenate metallic oxyhalides.

DETAILED DESCRIPTION OF THE INVENTION

It has now been discovered that compositions containing metallic oxyhalides can be successfully and rapidly dehalogenated at temperatures preferably under about 1600°F in an atmosphere containing vaporized alcohol. The rate of dehalogenation achieved with the vaporized alcohol containing atmospheres is equivalent to prior art practices utilizing wet hydrogen at temperatures greater than 1600°F without the loss of surface area (deadening) of the dehalogenated powder associated with the prior art practices. This surprising discovery enables increased economies in dehalogenation of metallic oxyhalides and has enabled production of metallic oxide powders having increased surface area. The process of this invention produces more active metallic oxide powders because there has been no appreciable loss of surface area during dehalogenation of the metallic oxyhalide.

The metallic oxyhalides present in compositions dehalogenated in the practice of this invention can generally be represented by the formula $M_aO_bX_c$ with M representing the metallic ions, O representing the oxygen ions and X representing the halide ions. The subscripts are identified as follows:

$a$ = the number of atoms of metal per molecule of metallic oxyhalide;

$b$ = the number of atoms of oxygen per molecule of metallic oxyhalide;

$c$ = the number of atoms of halogen per molecule of metallic oxyhalide.

As used in this specification the term halide includes the nonmetallic elements in combined form of the seventh group of the periodic system—fluoride, chloride, bromide and iodine ions. The halide component can include a mixture of the foregoing ions. The metallic ions can be one species or mixtures of several species with representative mixtures including uranium with plutonium, gadolinium, iron, etc. The formula expressing the relationship between the subscripts is $a \cdot v = 2b + c$ in which $v$ represents the valance of the metallic ion or the weighted valance where there is a mixture of metallic ions. Representative metallic oxyhalides dehalogenated in the practice of this invention include $UO_2F_2$, $UO_2F$, $UOF_2$, solid solutions of $UOF_2$ in $UO_2$, solid solutions of $UO_2F_2$ in $U_3O_8$, $PuOF_2$, $PuOF$, $(U,Pu)O_2F_2$, solid solutions of $(U,Pu)O_2F_2$ in a mixture of uranium dioxide and plutonium oxide, $TiOCl_2$, $ZrOCl_2$, $SiOCl_2$ and $WOCl_2F_2$.

The compositions containing metallic oxyhalides can contain one or more other components such as ceramics including the uranium oxides, especially uranium dioxide, plutonium oxide, gadolinium oxide, silicon dioxide, titanium dioxide, a mixture of uranium dioxide with one or more ceramics such as plutonium oxide and gadolinium oxide, etc.

The gaseous alcohol-containing atmospheres can include one or more vaporized aliphatic alcohols of the general formula $C_nH_{2n}HOH$ where $n$ is an integer from 1 to 10 inclusive including as representative methanol ($CH_3OH$), ethanol ($C_2H_5OH$), n-propyl ($CH_3CH_2CH_2OH$), isopropyl ($CH_3CHOHCH_3$), n-butyl $[CH_3(CH_2)_2CH_2OH]$, sec-butyl ($CH_3CH_2CHOHCH_3$), tert-butyl $[(CH_3)_3COH]$, n-pentyl $[CH_3(CH_2)_3CH_2OH]$, isopentyl $[(CH_3)_2CHCH_2CH_2OH]$, tert-pentyl $[CH_3CH_2C(OH)(CH_3)_2]$, n-hexyl $[CH_3(CH_2)_4CH_2OH]$, n-heptyl $[CH_3(CH_2)_5CH_2OH]$, n-octyl $[CH_3(CH_2)_6CH_2OH]$, n-nonyl $[CH_3(CH_2)_7CH_2OH]$ and n-decyl $[CH_3(CH_2)_8CH_2OH]$. While the cost is higher, other alcohols where $n$ is greater than 10 can be utilized and other compounds containing a hydroxyl group such as the aromatic alcohols can be employed.

The alcohol-containing atmospheres can also include additional gaseous components (as used herein "second gas") either serving as a carrier for the alcohol with the carrier being non-reactive with the composition being dehalogenated or serving as an active dehalogenation carrier in the atmosphere. Representative of the carriers inert to the dehalogenation reaction are air, oxygen, nitrogen, helium, neon, argon, krypton, xenon and mixtures of the foregoing. Representative of the active dehalogenation components mixed with the vaporized alcohol are reducing gases such as dry hydrogen, wet hydrogen, dissociated ammonia and mixtures of the foregoing. It is also contemplated that mixtures of the foregoing non-reactive carriers and active dehalogenation carriers can be utilized in this invention with the vaporized alcohol such as a mixture of vaporized alcohol with either nitrogen and hydrogen or argon and dissociated ammonia.

While any temperature achieving dehalogenation can be employed by utilizing heated furnaces receiving the alcohol-containing atmosphere, the temperature is generally under about 1600°F and preferably under about 1100°F where it is desired to have a powder of high surface area with the range of temperature being about 600° to about 1600°F and a preferred range of temperature being about 600° to about 1100°F. This range gives a rapid rate of dehalogenation while preserving high surface area of the dehalogenated powder. In general the higher the temperature used the greater the rate of dehalogenation achieved with greater hydrocarbon impurity content of the dehalogenated powder. The lower temperatures in the foregoing range give the highest surface areas for the defluorinated powder. Where the atmosphere used in the furnace contains only vaporized alcohol, a higher temperature up to about 1600°F can be utilized for the dehalogenation step without loss of activity of the dehalogenated powder with a particularly preferred range of temperature being about 1200° to about 1600°F. Again the rate of dehalogenation and the surface area of the dehalogenated powder vary with the particular temperature in the foregoing range as noted above.

If it is particularly desirable to avoid any loss of surface area of the powder being dehalogenated, a preliminary step is dehydrating the powder to a moisture content of less than about $10^{15}$ molecules of water per square centimeter of surface area (or less than about $3 \times 10^{-8}$ grams per square centimeter) before dehalogenation. The drying step can be practiced by heating the powder in the temperature range of about 100° to about 400°C for about 15 minutes to about 5 hours under a dry inert atmosphere such as nitrogen, helium, neon, argon, air, oxygen and mixtures of the foregoing. Agitation of the oxyhalide containing composition during dehydration is desirable.

To accomplish dehalogenation, the powder may be either placed in the cold furnace and brought to the temperature range presented above under the alcohol-containing atmosphere or the powder may be drawn in a container through a furnace maintained in the above temperature range specified above under the alcohol-sphere. If the resulting powder is to be free of hydrocarbon residues, a subsequent dealcoholation heating step in the range of 1250° to 1650°F is practiced in a reducing atmosphere free of alcohol vapors such as an atmosphere of hydrogen, wet hydrogen, dissociated ammonia or mixtures thereof. This subsequent step is referred to hereinafter as dealcoholation of the dehalogenated powder.

The powders have been successfully dehalogenated in static beds using controlled atmosphere furnaces. The rate of dehalogenation is increased where the powder is agitated during the time it is in the furnace with representative practice being to use a rotating bed furnace to agitate uniformly the composition containing the metallic oxyhalide to be dehalogenated.

Where the atmosphere maintained in the furnace contains only alcohol without a second gas, the alcohol is vaporized by heating a reservoir of alcohol so that a rate of flow of the alcohol vapor is sufficient to maintain a fresh dehalogenating atmosphere in the furnace. Where a second gas is mixed with the alcohol vapor such as an inert gas of nitrogen, helium, air, oxygen, neon, argon, krypton, xenon or mixtures thereof, or a reducing gas such as dry hydrogen, wet hydrogen, dissociated ammonia or mixtures thereof, the second gas is bubbled through the alcohol at ambient temperature and then introduced to the furnace. Representative partial pressures for the alcohol vapor in the furnace when mixed with a second gas are in the range of about 10 to about 80 torr, preferably about 20 to about 60 torr depending on the particular alcohol being employed, and the second gas pressure is about one atmosphere. For example, where methanol is used, the alcohol pressure is maintained at about 60 torr and where isopropanol is used the alcohol pressure is maintained at about 20 torr. The alcohol pressure in the furnace can be increased by heating the alcohol reservoir. The alcohol pressure maintained in the dehalogenating system is not critical to the practice of the process. Where only alcohol vapor is used as the furnace atmosphere, the alcohol pressure in the furnace is about one atmosphere.

The amount of alcohol needed to conduct the dehalogenation reaction can be stated on a theoretical molar basis of about 1 mole of alcohol per mole of fluoride ion to be removed from the metallic oxyhalide containing powder but in practice an excess of from about 3 to about 7, preferably about 5 moles of alcohol per mole of fluoride ion is used. For example, when uranyl fluoride is defluorinated, about 10 moles of methanol are used per mole of uranyl fluoride, with only about 2 moles of alcohol being consumed in the defluorination process. The amount of excess alcohol in the dehalogenation system is related to the degree of agitation of the powder and may be reduced through use of powder agitation.

The alcohols employed in the practice of this invention are reagent grade alcohols from low impurity bottled sources (less than 0.5 percent by weight impurities). Except when air is the second gas, the second gas (inert gas or active gas) generally contains less than 100 parts per million of all impurities.

Referring now to the FIGURE, there is shown a furnace 10 such as an inductively heated furnace having a sample boat 11 holding a metallic oxyhalide containing powder 12. The temperature of the furnace is determined by sheathed thermocouple 13 with thermocouple leads 14 being connected to potentiometer 15 and thermocouple leads 16 being connected to temperature indicator 17 and variable power source 18. Indicator 17 controls the amount of power from power source 18 being transmitted in line 19 to furnace 10. A second gas such as from cylinder 20 or cylinder 34 or from both cylinders is fed through line 21 as controlled by flow meter 22 through line 23 to an alcohol vapor generator 24 when valves 26 and 31 are closed and valves 27 and 28 are open. The alcohol vapor generator 24 can be a heated or an unheated reservoir of alcohol and this arrangement gives a mixture of alcohol and the second gas. The temperature of the alcohol is shown by thermometer 25. The second gas can be an inert gas or hydrogen, wet hydrogen, dissociated ammonia or a mixture of the foregoing. In practice one cylinder 34 could be an active dehalogenation carrier such as hydrogen and the other cylinder 20 could be a non-reactive carrier such as argon. Where only the second gas is to be circulated to the furnace chamber 30, valves 27 and 28 are closed while valves 26 and 31 are open. This arrangement is used where the metallic oxyhalide containing powder is dehydrated before being dehalogenated. An additional valve 29 can be used to prevent air from entering the furnace when line 21 is open (e.g., to add a new cylinder 20 or a new cylinder 34 to the line). The gases coming off the furnace are passed through halide gas recovery unit 32 and hydrogen burner 33 and then released to air.

The processes practiced in this invention will be discussed with reference to the FIGURE. Where a preliminary drying or dehydration of the powder is desired, the boat 11 holding the powder 12 is placed in the furnace and valves 27 and 28 are closed with valves 26 and 31 being in an open position. A source of gas such as from cylinder 20 or cylinder 34 or both is metered into line 21 through flow meter 22. The gas goes through line 32 to furnace 10 which is heated to a temperature in the range of about 100° to about 400°C. This drying step is performed for about 15 minutes to about five hours depending on the batch size and this step preserves the surface area of the powder so that it can be sintered to very dense structures.

When the drying step is completed or if no drying step is deemed necessary, the valves 26 and 31 are closed with valves 27, 28 and 29 open and a second gas such as from cylinder 20 or cylinder 34 or both cylinders is fed through line 21 to flow meter 22, into line 23 to alcohol vapor generator 24 and then to furnace chamber 30. The furnace is maintained at the desired dehalogenation temperature in the range of about 600° to about 1600°F. The alcohol vapor generator 24 is maintained at a temperature in the range of about 50° to about 75°F to give a nearly saturated alcohol atmosphere introduced in the furnace. The gas is passed to the furnace until the halide ion concentration is removed from the powder 12 which in practice has taken about one to about 15 hours, depending on the batch size and whether the powder is agitated.

Where only alcohol vapor without a second gas is to be introduced to the furnace chamber 30, gas cylinders 20 and 34 are turned off and valves 26, 27 and 31 are turned off while valves 28 and 29 are left open. The furnace 10 is heated to a temperature in the range of about 1200° to about 1600°F. The alcohol vapor generator is heated to a temperature in the range of about 150° to about 250°F to give a desired flow rate of alcohol to the furnace in the range of about one to about 10 cubic feet per hour.

If ceramic specifications require a metallic oxide free of hydrocarbon residues, gas source from cylinder 34 which can be a reducing gas such as hydrogen or dissociated ammonia is passed through line 32 to the furnace 10 with valves 27 and 28 being closed and valves 26, 29 and 31 being open. The furnace 10 is maintained at a temperature in the range of about 1250° to about 1650°F for up to about 60 minutes to assure removal of hydrocarbon residues from the ceramic compositions. A stoichiometric oxide product, for example, for a uranium dioxide product in which the ratio of oxygen atoms to metal atoms is substantially 2.00:1, may be produced or maintained during cooling of the dehalogenated oxide product when gas source 20 is a reducing atmosphere. Such an atmosphere may consist of hydrogen in the case of uranium oxides. In a preferred practice of this invention, propyl alcohol is employed as the vaporized alcohol as no hydrocarbon residues are found on the dehalogenated powder.

The following examples are offered to show representative processes of the disclosed invention as carried out to dehalogenate metallic oxyhalides containing compositions. The following examples are offered to be representative of the teaching of this process and in no way serve to limit the teaching of this invention.

EXAMPLE 1

15 grams of uranium oxyfluoride ($UO_2F_2$) powder are placed into a type 304 stainless steel boat for defluorination in a static bed, controlled atmosphere furnace having a type 304 stainless steel muffle with diameter of 1½ inches. The furnace and arrangement of gases is similar to that shown in the FIGURE with the furnace having Varian Conflat flanges welded onto the ends. The carrier gas for the alcohol is bottled hydrogen and the gas lines are arranged so hydrogen can by-pass the alcohol vapor generator which was maintained at 50°±5°F for the entire time alcohol vapor was introduced to the furnace. Furnace temperatures were measured with a stainless steel clad chromel-alumel thermocouple located inside the furnace muffle directly above the powder. The gas exiting from the furnace is directed through a potassium hydroxide titration apparatus, then into a mass spectrometer and a liquid nitrogen cooled cold trap. The gas effluent from the cold trap is then burned in air.

The furnace is heated over a period of 30 minutes to 600°F while hydrogen is passed through the furnace to dehydrate the powder. The furnace is next heated over a period of 10 minutes to 950°F and hydrogen is bubbled through the alcohol vapor generator containing methanol (which is maintained at 50°±5°F) for 16 hours to defluorinate the powder. The furnace is heated to 1200°F for one hour while receiving only hydrogen to remove hydrocarbon residues from the powder. The sample is cooled in the furnace under the hydrogen atmosphere and removed from the furnace. The resulting powder was uranium dioxide having a surface area of 6.0 square meters per gram and a fluoride ion content under six parts per million. Surface area was measured by the standard practice of nitrogen absorption (Brunauer-Emmett-Teller technique and herein after referred to as "B.E.T.").

EXAMPLES 2–14

The general procedure of Example 1 was repeated using the same apparatus and the parameters reported in Table 1 below. In consecutive columns, Table 1 reports the Example number, the weight of the batch of sample being defluorinated in grams, the composition of the gas used for dehydration, the time in minutes for dehydration, the temperature of dehydration, the temperature of defluorination, the composition of the defluorination atmosphere, the time in hours of defluorination, the composition of the dealcoholation atmosphere if the powder is to be substantially freed of hydrocarbon residues (blanks indicate this step is omitted), the time in hours of dealcoholation, the temperature of dealcoholation, the surface area of the resulting powder in square meters per gram, and the final fluoride content of the powder. In all examples using a carrier gas the gas flow through the furnace is between 2 and 6 cubic feet per hour. For examples using boiling alcohol only, the gas flow through the furnace is about 50 cubic feet per hour.

In Examples 2–7, 9, 10, 13 and 14, the sample is uranium oxyfluoride powder. In Examples 8, 11 and 12, the sample is a single oxyfluoride phase powder having the approximate molecular composition $U_3O_6F_2$ containing 3.9 percent by weight of fluoride ion.

As will be apparent to those skilled in the art, various modifications and changes may be made in the method described herein. It is accordingly the intention that the invention be construed in the broadest manner within the spirit and scope as set forth in the accompanying claims.

TABLE 1

| Example No. | Batch weight (grams) | Dehydration step Composition of gas | Time (min.) | Temp. (°F.) | Defluorination step Temp. (°F.) | Composition of gas | Time (hours) | Dealcoholation step Composition of gas | Time (hours) | Temp. (°F.) | Powder surface area (M²/g.)[1] | Final fluoride content of powder (weight percent) |
|---|---|---|---|---|---|---|---|---|---|---|---|---|
| 2 | 15 | $H_2$ | 35 | 560 | 770 | Saturated $CH_3OH$ in $H_2$ | 1½ | Wet hydrogen | 3 | 770–1,600 | ca. 4 | $5.4 \times 10^{-4}$ |
| 3 | 15 | $H_2$ | 20 | 550 | 550–940 | do | 2 | do | 2 | 1,750 | ca. 4 | $3.4 \times 10^{-4}$ |
| 4 | 15 | Argon | 30 | 550 | 550–1,060 | Saturated $CH_3OH$ in argon | 5 | Argon | ½ | 900 | ca. 6 | $4.7 \times 10^{-3}$ |
| 5 | 15 | $H_2$ | 35 | 550 | 550–1,030 | Saturated $CH_3OH$ in $H_2$ | 2 | Wet hydrogen | <½ | <1,750 | ca. 4 | $8.9 \times 10^{-4}$ |
| 6 | ca. 50 | $H_2$ | 30 | 400 | 600–940 | Boiling $CH_3OH$ only | 3 | Wet $H_2$ | (²) | 1,600 | 9.7 | $<5.0 \times 10^{-3}$ |
| 7 | 7,8 | $H_2$ | 120 | 450 | 780 | Saturated $CH_3OH$ in $H_2$ | 4½ | Dry $H_2$ | (³) | 1,600 | 5.6 | $4.8 \times 10^{-3}$ |
| 8 | 25 | $H_2$ | 30 | 370 | 770 | do | 1 | do | 3 | 1,600 | 10.2 | $1.5 \times 10^{-3}$ |
| 9 | 15 | Argon | 60 | 420 | 800–1,000 | Saturated $C_2H_5OH$ in argon | ⅓ | Argon | 3 | 1,290 | ca. 8 | $1.4 \times 10^{-3}$ |
| 10 | 106 | $H_2$ | 150 | 370 | 760 | Saturated $C_2H_5OH$ in $H_2$ | 3 | $H_2$ | 3 | 1,300 | ca. 8 | $2.6 \times 10^{-3}$ |
| 11 | 24 | $H_2$ | 30 | 370 | 690 | do | 3 | do | ⅓ | 1,360 | 11.3 | $1.4 \times 10^{-1}$ |
| 12 | 25 | $H_2$ | 30 | 370 | 670 | do | ⅓ | | | 1,315 | 10.5 | $2.3 \times 10^{-1}$ |
| 13 | 50 | $H_2$ | 30 | 400 | 750 | Boiling $C_2H_5OH$ only | 1 | $H_2$ | ½ | 1,050 | ca. 6 | $1.8 \times 10^{-3}$ |
| 14 | 6.9 | $H_2$ | 120 | 400 | 600–800 | $C_2H_5OH$ in $H_2$ | 6 | | | | 5.8 | |

[1] Surface area measured by B.E.T. except for Examples 2–4, 9, and 10 which are determined by visual comparison with measured samples.
[2] First hour.
[3] Next ½ hour.

What is claimed is:

1. A method of dehalogenating a composition comprising a metallic oxyhalide wherein the metallic portion is selected from the group consisting of uranium, plutonium, titanium, zirconium, silicon, tungsten and mixtures thereof comprising the step of heating the composition at a temperature in the range of about 600°F to about 1600°F in a dehalogenating atmosphere comprising a vaporized alcohol.

2. A method according to claim 1 where the controlled atmosphere includes a carrier gas.

3. A method according to claim 2 where the carrier gas is inert with respect to the dehalogenation reaction and is selected from the group consisting of nitrogen, helium, air, oxygen, neon, argon, krypton, xenon and mixtures of the foregoing.

4. A method according to claim 2 where the carrier gas is active with respect to the dehalogenation reaction and is selected from the group consisting of hydrogen, wet hydrogen, dissociated ammonia and mixtures of the foregoing.

5. A method according to claim 2 where the temperature is maintained in the range of about 600° to about 1100°F.

6. A method according to claim 1 where the atmosphere consists essentially of vaporized alcohol and the temperature is in the range of about 1200 to about 1600°F.

7. A method according to claim 1 in which is practiced the preliminary step of dehydrating the composition containing metallic oxyhalides at a temperature in the range of about 100° to about 400°C under an inert atmosphere.

8. A method according to claim 1 where a subsequent dealcoholation step is practiced on the dehalogenated composition comprising heating the composition in the range of about 1250° to about 1650°F in an atmosphere selected from the group consisting of hydrogen, wet hydrogen, dissociated ammonia and mixtures thereof.

9. A method according to claim 1 in which the composition containing metallic oxyhalides is agitated during heating.

10. A method according to claim 1 in which the halide ions removed from the metallic oxyhalides are recovered as an acid by passing the dehalogenation atmosphere withdrawn from the furnace through water.

11. A method according to claim 1 in which the alcohol is propyl alcohol.

12. A method according to claim 1 in which the alcohol is methanol.

* * * * *